United States Patent [19]

Yaguchi et al.

[11] Patent Number: 5,220,634

[45] Date of Patent: Jun. 15, 1993

[54] CONTROL CIRCUIT FOR A DC MOTOR

[75] Inventors: Osamu Yaguchi; Mitsunori Arakawa, both of Kashiwazaki, Japan

[73] Assignee: Kabushiki Kaisha Riken, Tokyo, Japan

[21] Appl. No.: 823,140

[22] Filed: Jan. 16, 1992

[30] Foreign Application Priority Data

| Jan. 18, 1991 | [JP] | Japan | 3-18382 |
| Jan. 18, 1991 | [JP] | Japan | 3-18384 |
| Feb. 16, 1991 | [JP] | Japan | 3-44370 |

[51] Int. Cl.[5] .............................. H02P 1/18; H02P 3/08
[52] U.S. Cl. ...................................... 388/819; 318/459; 388/928.1
[58] Field of Search ............... 318/244, 245, 246, 248, 318/264, 265, 266, 286, 459, 466, 467, 468, 469, 500; 388/928.1, 803, 804, 819

[56] References Cited

U.S. PATENT DOCUMENTS

| 3,913,002 | 10/1975 | Steigerwald et al. | 321/2 |
| 3,924,166 | 12/1975 | Doeman | 318/138 |
| 4,233,549 | 11/1980 | Dighe | 318/317 |
| 4,479,077 | 10/1984 | Kemmel et al. | 318/245 |
| 4,494,057 | 1/1985 | Hotta | 318/317 |
| 4,611,154 | 9/1986 | Lambropoulos et al. | 318/490 |
| 4,633,153 | 12/1986 | Thornton et al. | 318/280 |
| 4,905,300 | 2/1990 | Bhagwat et al. | 388/800 |
| 5,051,672 | 9/1991 | Yaguchi | 318/469 |
| 5,097,186 | 3/1992 | Kokubu | 318/280 |

FOREIGN PATENT DOCUMENTS 0345914 12/1989 European Pat. Off. .

Primary Examiner—Bentsu Ro
Attorney, Agent, or Firm—Parmelee, Bollinger & Bramblett

[57] ABSTRACT

A DC power supply for a DC motor is controlled by a drive transistor. An "ON" state of the drive transistor is maintained by a comparator which compares a terminal voltage at a point between the DC motor and the drive transistor with a reference voltage supplied from the power supply. A clock pulse is applied to the drive transistor to make it periodically turn off in order to detect an induced voltage depending upon the rotation rate of the DC motor. The drive transistor returns to turn off upon stopping the rotating DC motor by force.

A regulator is provided between the power supply and the reference voltage. A restraint torque and a rotation rate control means are also provided.

Alternatively, a pulsating power supply is provided instead of the DC power supply and the clock.

7 Claims, 4 Drawing Sheets $V_F$ = Forward Voltage for Diodes 55 & 58 or 56 & 57

CONTROL CIRCUIT FOR A DC MOTOR

BACKGROUND OF THE INVENTION

1. Field of the Invention

The present invention generally relates to a circuit for controlling an electric motor, and more specifically a circuit for controlling a DC motor which is suitable for use in driving window glasses in a power window system of a vehicle.

2. Prior Art

Referring now to FIG. 1, a conventional circuit for controlling a restraint torque of a DC motor which has been applied by the present inventor and accorded under JP-A-1-311883 as a laid-open number in Japan is generally shown. A DC power supply 1 is connected between a Vcc line and ground or GND. A DC motor 2 is connected between the Vcc line of the power supply and its drain of an N-channel MOSFET (Metal Oxide Semiconductor Field Effect Transistor) 3 for driving the DC motor 2 via a relay terminal 4. The MOSFET 3 also has its source connected to ground and its gate connected to a collector of a PNP transistor 5. The PNP transistor 5 has its emitter connected to the Vcc line and its base connected to an input terminal 6 via a resistor 7. A negative trigger pulse P1 is provided to the input terminal 6 and the PNP transistor 5 is turned on to turn on MOSFET 3. The MOSFET 3 in an ON state provides a current to the DC motor 2 and the motor 2 rotates during the negative trigger pulse.

A comparator 8 for maintaining the rotation of the DC motor 2 is connected between the Vcc line and ground a via supply bus not shown. The comparator has its inverting input connected to the relay terminal 4 or the drain of the MOSFET 3, its non-inverting input connected to a variable terminal of a variable resistor 9 connected between the Vcc line and ground, and an output connected to the gate of the MOSFET 3 via a resistor 10. The comparator 8 compares the terminal voltage $V_T$ of the relay terminal 4 with the reference voltage $V_R$. The terminal voltage $V_T$ is defined to subtract the induced voltage $V_I$ from the Vcc. The comparator 8 outputs a logical "H" when $V_T < V_R$. Therefore, once the negative trigger pulse P1 is applied to the trigger terminal 6, the MOSFET 3 is turned on, the drain voltage $V_T$ of the terminal 4 becomes a saturated voltage lower than that of the reference voltage $V_R$ and the comparator provides "H" to the gate of the MOSFET 3 to latch up the MOSFET 3 and to maintain the rotation of DC motor 2.

The DC motor 2 generates pulses each having an absolute induced voltage $V_I$ depending upon the rotation rate during the rotation thereof. Each pulse has a pair of negative and positive pulse components when a rotor of the DC motor 2 upon rotating comes to a predetermined angular position relative to a stator thereof. Even if the MOSFET 3 does not provide momentary power to the rotating DC motor 2, the rotating DC motor 2 will be rotated by a inertia and will generate the pulses.

An NPN transistor 11 is provided to periodically turn off the MOSFET 3 and to check the rotation condition of the DC motor 2 incorporated with the comparator 8. The NPN transistor 11 has its collector connected to the gate of MOSFET 3, its emitter connected to ground and its base connected to a clock terminal 12 via a resistor 13. Positive clock pulses P2 are periodically applied to the clock terminal 12 to provide a comparison period and the NPN transistor 11 is turned on to periodically turn off the MOSFET 3.

Upon applying the positive clock pulse, the comparator 8 can compare the terminal voltage $V_T$, which will not interfere with the drain voltage of the MOSFET 3, with reference voltage $V_R$. If $V_T$ is lower than $V_R$, then the comparator 8 provides a "H" level to the gate of the MOSFET 3 after ending the compared period and the MOSFET 3 returns to the latch condition. If the $V_T$ is higher than $V_R$, then the comparator 8 provides a "L" level to the gate of the MOSFET 3 after ending the compared period and the MOSFET 3 maintains a turn off condition. Supposing that the DC motor 2 controlled by the MOSFET 3 drives a window glass to close a door window of the vehicle, and the window glass is moving for example up to close the window by the trigger pulse, then DC motor 2 maintains the rotation by the inertia notwithstanding the applied periodical positive clock pulses unless the window glass meets with an obstacle against a frame of the door.

If the periodical clock pulses are not applied to the terminal 12, it is an unfavorable condition for the DC motor 2 that the window glass meets with an obstacle against a frame of the door because the rotating DC motor 2 receiving the power must be stopped to prevent damage by the obstacle. Also, internal coils of the DC motor 2 may be burned and cut by a static current through the DC motor 2.

However, by applying the periodical clock pulses to the terminal 12, an DC motor 2 does not generate the induced voltage when stopped. Accordingly the latch condition provided between the comparator 8 and the MOSFET 3 for supplying the power thereto is released.

Referring now to FIG. 2, a second conventional circuit for controlling a DC motor which also has been applied by the present inventor and accorded under JP-patent application No. 2-5401 filed on Jan. 23, 1990 is generally shown. In FIG. 2, components corresponding to those of FIG. 1 allocate the same numerals, respectively and detail descriptions are omitted. A resistor 14 is connected between the relay terminal 4 and the inverting input of the comparator 8. Two resistors 15 and 16 each connected to one of fixed terminals of the variable resistor 9 are connected to the Vcc line and ground, respectively to provide a finer adjustment of the reference voltage $V_R$ than that of FIG. 1. A wired AND function of the resistor 10 and the NPN transistor 11 in FIG. 1 is substituted with a two input AND gate 17. The AND gate 17 has its output connected to the gate of MOSFET 3, one input connected to the output of the comparator 8, and another input connected to an oscillator 18 for providing the negative periodical clock. Also, the PNP transistor 5 not shown in FIG. 2 may be added with its collector connected to the gate of MOSFET 3, its emitter connected to the Vcc line and its base connected to the input terminal 6 via the resistor 7 as shown in FIG. 1.

An operation of the second conventional control circuit for a DC motor as shown in FIG. 2 is identical to that of FIG. 1, so a detailed description of the operation is omitted.

These control circuits are advantageous compared to a conventional circuit having a series resistor passing through a supply current to a DC motor because the series resistor can be employed for monitoring a DC motor current but has a serious loss of the current which degrades the efficiency of the power energy supplied thereto.

Such a motor 2 is generally employed as a drive means for a power or automatic window, while a secondary battery is used as a DC power supply of the vehicle. The battery has many electrical connections to equipments such as a cooler, a dynamo, head lights, a car-radio machine, etc. installed in the vehicle. The voltage of the Vcc line connected to the battery is undesirably changed when any equipment is turned on or off. This change of Vcc causes a change of a restraint torque of a DC motor, that is, higher power supply voltage causes an increasing restraint torque, while lower power supply voltage causes a decreasing restraint torque of the motor.

In FIGS. 1 and 2, a critical or minimum current $I_{min}$ whether rotation of the DC motor 2 is maintained or not is as follows.

$$I_{min} = (Vcc - V_I)/Rm = V_R/Rm$$

wherein, Vcc denotes a power supply voltage, $V_I$ denotes a induced voltage, and Rm denotes an internal resistance of the DC motor 2. Therefore, the restraint torque depends upon the critical current $I_{min}$. The critical current changes due to a change of the reference voltage $V_R$ and in turn a change of the power supply voltage Vcc.

The conventional circuits as shown in FIGS. 1 and 2, can control the restraint torque of the motor but not the rotation rate or speed. It is not practical to control the rotation rate by using a dynamo directly connected to a shaft of the DC motor because of high cost.

The conventional DC motor 2 as shown in FIG. 1 or 2 generally needs a direct current (DC) power supply. In the vehicle such as an automobile, it is frequent that the DC power supply is obtained from an AC power supply such as an alternator or dynamo with a rectifying circuit for providing a pulsating power supply from the AC power supply and a smoothing capacitor or battery for smoothing the pulsating power as indispensable means. The oscillator 18 comprising an unstable mutivibrator by using a 555 available from Signetics or a crystal oscillator and clock dividers, should be omitted because the circuit is more complex and the mean time between failures (MTBF) will be increased if the oscillator 18 is omitted. The power consumed by the control circuit, mainly the pulse oscillator and comparator is not be negligible.

SUMMARY OF THE INVENTION

Accordingly, it is an object of the present invention to provide a circuit for controlling a rotation speed as well as a restraint torque of a DC motor.

It is another object to provide a DC motor control circuit for regulating a restraint torque even if the voltage of a power supply is changed.

It is an additional object to provide a control circuit of a DC motor without a pulse oscillator which makes a drive transistor for the DC motor periodically turn off.

According to an aspect of the present invention, a circuit for controlling a motor comprises a DC power supply having a hot line connected to said motor and a cold line, a drive transistor connected between said motor via a relay terminal and said cold line to drive said motor, trigger means for supplying a trigger pulse to said drive transistor to provide an ON state of said drive transistor, means for comparing a terminal voltage on said relay terminal with a reference voltage and providing an output to said drive transistor, means for periodically turning off said drive transistor to detect said terminal voltage depending upon the rotation of said motor, means coupled to a power supply voltage, for regulating said reference voltage and means for checking said power supply voltage to make said drive transistor turn off if said power supply voltage is lower than a predetermined voltage.

BRIEF DESCRIPTION OF THE DRAWINGS

A better understanding of the present invention can be obtained when the following detailed description of the preferred embodiments are considered in conjunction with following drawings, in which.

DETAILED DESCRIPTION OF THE PREFERRED EMBODIMENTS

Figure 1:
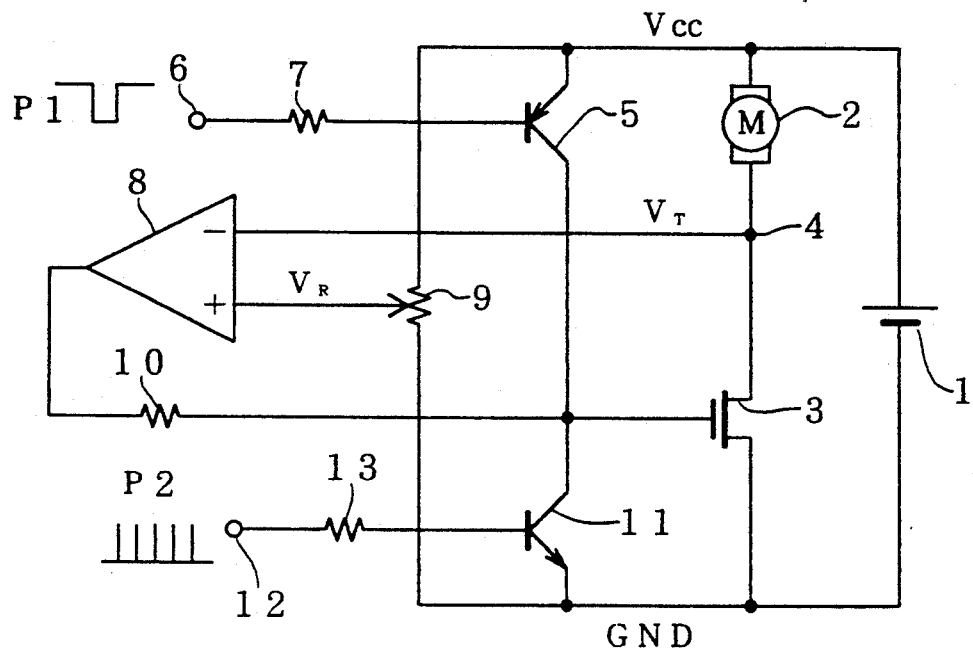
FIG. 1 and 2 are schematic diagrams showing conventional control circuits of DC motors.
Figure 2:
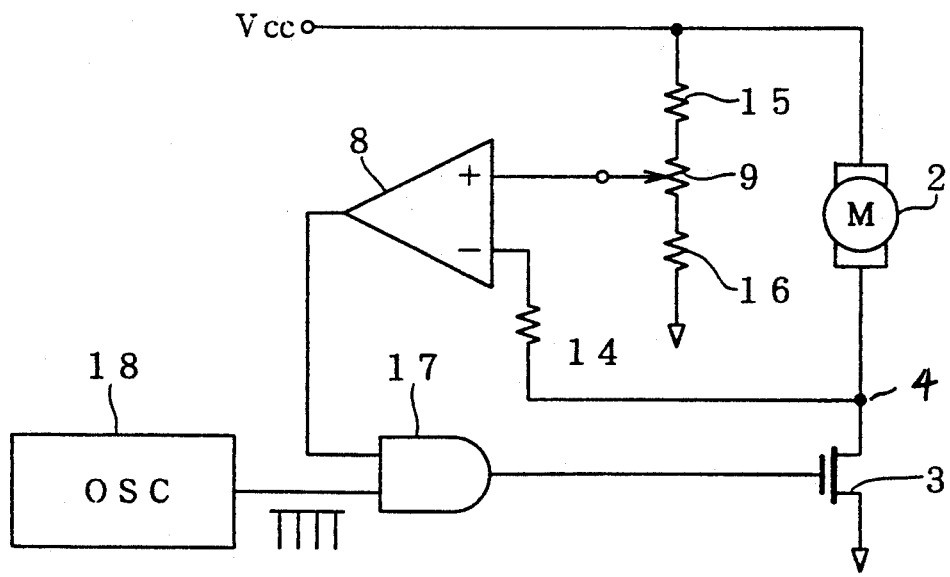
Figure 3:
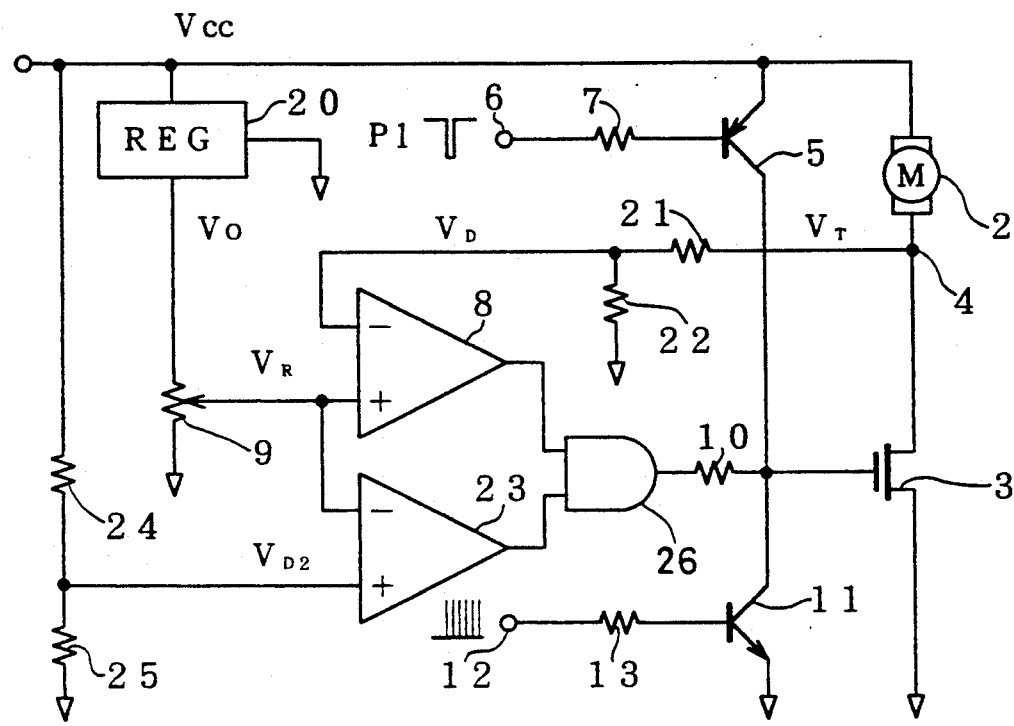
FIG. 3 is a schematic diagram of a circuit for controlling a DC motor showing a first embodiment of the invention.

Referring now to FIG. 3, a first embodiment of the invention, that is, a circuit for controlling a DC motor is generally shown. In FIGS. 3 to 5 and 7, the same reference numerals are used to denote the same components or parts as those in the prior art as shown in FIGS. 1 and 2 and detail descriptions are omitted.

In FIG. 3, a voltage regulator 20 is connected at its output to the variable resistor 9 to provide a regulated reference voltage $V_R$ to the comparator 8. The voltage regulator 20 is constructed as, for example, a 5-volt three terminal type IC (Integrated Circuit) or discrete circuit, its input being connected to the Vcc line and its common being connected to ground to provide the regulated voltage Vo (Vo=5 V) to the variable resistor 9 after buffering or absorbing a voltage change of the Vcc line. The variable resistor 9 therefore has fixed terminals connected to the output of the voltage regulator 20 and ground respectively, and its movable terminal or tap connected to a non-inverting input of the comparator 8 to provide the reference voltage thereto. While an inverting input of the comparator 8 receives a dividing voltage $V_D$ obtained by dividing the terminal voltage $V_T$ (or Vcc−$V_I$) of the terminal 4 by two resistors 21 and 22. The resistor 21 therefore is connected between the terminal 4 and the inverting input while the resistor 22 is connected between the inverting input and ground.

Additionally, the reference voltage $V_R$ is also applied to an inverting input of a second comparator 23 to check the power supply voltage. Therefore, a non-inverting input of the second comparator 23 receives a second dividing voltage $V_{D2}$ obtained by dividing the power supply voltage Vcc by two resistors 24 and 25. The resistor 24 therefore is connected between the Vcc line and the non-inverting input while the resistor 25 is connected between the non-inverting input and ground. The second comparator 23 compares the reference voltage $V_R$ with the second dividing voltage $V_{D2}$ and outputs a logical "H" to one input of a two input AND gate 26 when $V_{D2} > V_R$. The AND gate 26 has its second input connected to the output of the comparator 8 and its output connected to the gate of the MOSFET 3 via the resistor 10.

An operation of the first embodiment is described hereinafter.

In FIG. 3, a critical or minimum current $I_{min}$ whether rotation of the DC motor 2 is maintained or not is as follows.

$$I_{min} = (Vcc - V_I)/Rm = (R1 + R2) \times V_R/(R1 \times Rm)$$

wherein, Vcc denotes the power supply voltage, $V_I$ denotes a induced voltage, Rm denotes an internal resistance of the DC motor 2, and R1 and R2 denote resistances of the resistors 21 and 22, respectively. Therefore, the restraint torque depends upon the critical current $I_{min}$. Then the restraint torque is not changed when $Vcc - V_I$ is constant even if Vcc changes. Also, the restraint torque is not change when the reference voltage $V_R$ is constant even if Vcc changes.

In FIG. 3, the regulated output voltage Vo of the voltage regulator or regulating element 20 is applied to the variable resistor 9 to provide the reference or a restraint torque setting voltage $V_R$. The resistors 21 and 22 need to be provided to apply a dividing voltage of the terminal voltage $V_T$ (or $Vcc - V_I$) to the inverting input of the comparator 8 in order to generate a sufficient torque to the DC motor 2 because the output voltage Vo is lower than the power supply voltage Vcc. Then, resistances of the resistors 21 and 22 are determined so that maximum torque is obtained under $Vo > V_D$ upon stopping the DC motor 2.

The second comparator 23 solves a problem in which the output of the comparator 8 is always logical "H" in the case that the Vcc is lowered enough to fulfill the equation $V_R > V_D$ when the motor 2 is stopped. The values of the resistors 24 and 25 each connected to the noninverting input of the second comparator 23 are determined to fulfill $R3/R4 > (R1 + Rm)/R2$, where R3 and R4 denote values of the resistors 24 and 25, respectively.

As values of the resistors 21, 22, 24 and 25 are determined as described the above, the reference voltage $V_R$ is higher than the second dividing voltage $V_{D2}$ before the reference voltage $V_R$ becomes higher than the dividing voltage $V_D$. As a result, the output of the comparator 23 goes low level to turn off the MOSFET 3 to shut down power supply to the DC motor 2. The second comparator 23 then determines the minimum operation voltage of the Vcc line to the motor 2.

The AND gate 26 may be substituted with a two input NOR gate if respective signals applied to the inverting and noninverting inputs of the comparator 8 or 23 are exchanged.

According to the first embodiment of the present invention, there is an advantage in which the restraint torque of the motor 2 is not changed if the power supply voltage is changed. Another advantage is that an unstable motor operation by low power supply voltage is avoided due to the second comparator.

Figure 4:
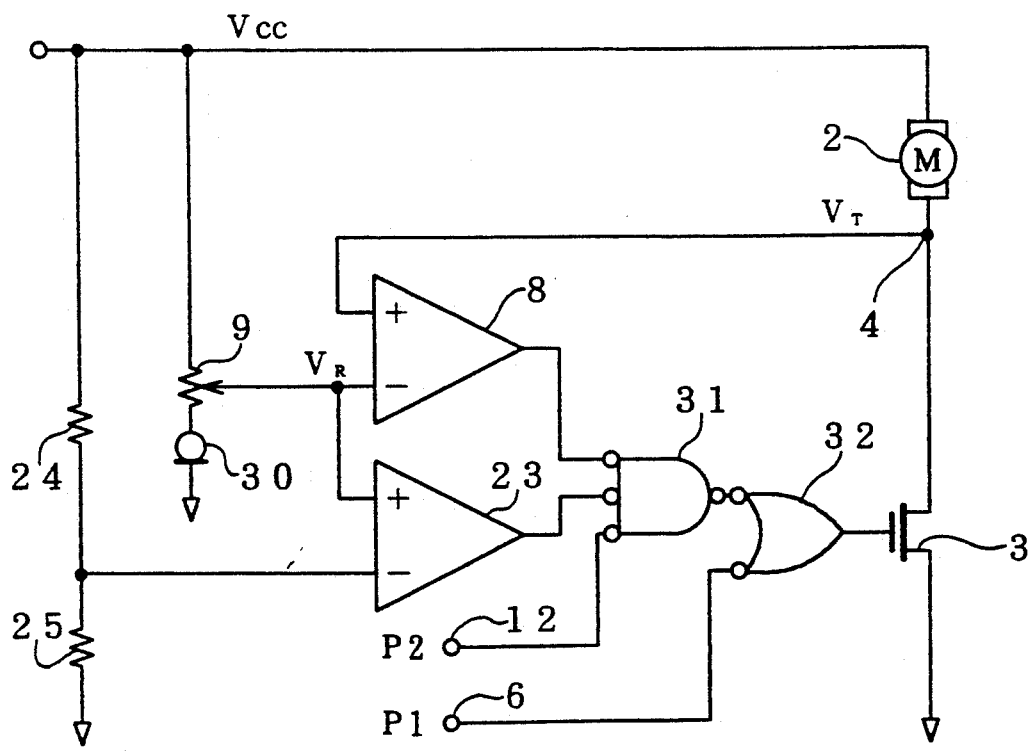
FIG. 4 is a schematic diagram modifying the control circuit of FIG. 3.

Referring now to FIG. 4, a modified embodiment of the first embodiment is generally shown. A current regulated diode (CRD) or current source 30 is provided as a substitute for the voltage regulator 20 in FIG. 3 for providing a regulated reference voltage $V_R$ in conjunction with the variable resistor 9. The resistor 9 is connected, for example, to the Vcc line and an anode of the CRD 30 while a cathode of the CRD is connected to ground.

A three input OR gate 31 is provided as a substitute for the AND gate 26, NPN transistor 11 and resistor 13 in FIG. 3 when respective signals applied to the inverting and noninverting inputs of the comparator 8 or 23 are exchanged. Three inputs of the OR gate 31 are outputs of the comparators 8 and 23, and the clock terminal 12 for the periodical pulse P2.

A two input NAND gate 32 is provided as a substitute for the PNP transistor 5 and resistor 7 in FIG. 3. Two inputs of the NAND gate 32 are the output of the OR gate 31 and the trigger terminal 6 for P1. The output of the NAND gate 32 is connected to the gate of the MOSFET 3.

Figure 5:
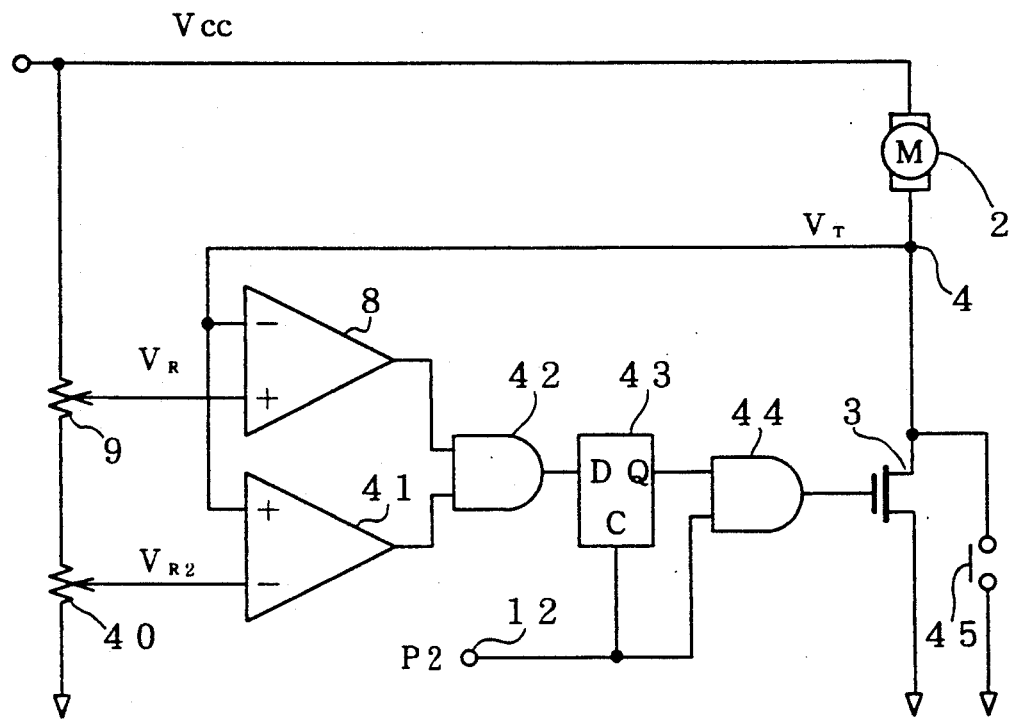
FIG. 5 is a schematic diagram of a circuit for controlling a DC motor showing a second embodiment of the invention.
Figure 6:
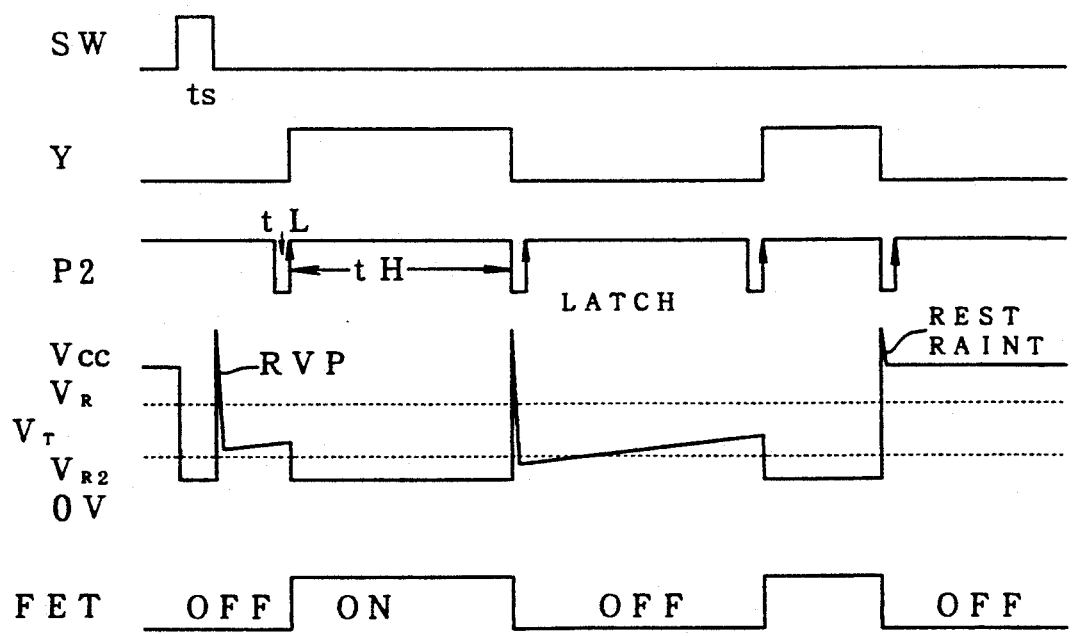
FIG. 6 is a timing chart of the control circuit of FIG. 5.

Referring now to FIGS. 5 and 6, a second embodiment of the invention, that is, a circuit for controlling a restraint torque and the rotation speed of a DC motor and its timing chart are generally shown.

In FIG. 5, connected between the fixed terminal of the variable resistor 9 remote from the another fixed terminal connected to the Vcc line, and ground is a second variable resistor 40 to provide a rotation speed setting voltage $V_{R2}$ to a third comparator 41. The second variable resistor 40 has its movable terminal or tap connected to an inverting input of the third comparator 41 while a noninverting input of the comparator 41 receives the terminal voltage $V_T$ (or $Vcc - V_I$) of the terminal 4. The third comparator 41 compares the terminal voltage $V_T$ with the rotation speed setting voltage $V_{R2}$ and outputs a logical "H" when $V_T < V_{R2}$ to one input of a two input AND gate 42. The second input of the AND gate 42 is connected to the output of the comparator 8.

The output of the AND gate 42 is connected to the D input of a transparent latch 43. The latch 43 has its clock C connected to the clock terminal 12 to which a negative clock pulse P2 is applied. The clock pulse P2 consists of a oscillation of a logical "H" or "tH" period and a logical "L" or "tL" period. In the latch 43, data at the D input passes through the Q output when the clock goes logical "L" while the data at the D input is latched or memorized on the Q output when the clock goes logical "H". When a CMOS 4042B available from RCA Corporation is used as the latch 43, its polarity terminal is connected to ground. The Q output of the latch 43 is connected to one input of a second two input AND gate 44. The second AND gate 44 has its second input connected to the clock terminal 12 and its output connected to the gate of the MOSFET 3. Connected between drain and source of the MOSFET 3 is a trigger switch 45 for triggering the motor 2 instead of the PNP transistor 5 and resistor 7 of FIG. 3.

FIG. 6 shows a timing chart of portions of the control circuit as shown in FIG. 5.

In FIGS. 5 and 6, once the trigger switch 45 is turned on for a short period (ts), the terminal voltage $V_T$ goes to zero potential (or voltage) and the motor 2 begins to rotate, and then rotates at the maximum speed. The zero potential of the terminal voltage $V_T$ of the terminal 4 is also applied to the third comparator 41. The third comparator 41 compares the terminal voltage $V_T$ with the second reference voltage $V_{R2}$, and because $V_T < V_{R2}$ provides a "L" to the latch 43 via the AND gate 42. This "L" at the D input is latched with by the next periodical clock pulse P2 and is outputted via the Q output of the latch 43 and the second AND gate 44 to the gate of the MOSFET 3 to turn off the MOSFET 3.

As the switch 45 is turned off after the short period (ts), rotator coils of the motor 2 generate the reverse voltage pulse or RVP in which the terminal voltage $V_T$ ($V_T = Vcc - V_I$) is suddenly sharply increased and then sharply decreased. After that, as the motor 2 has already rotated, the terminal voltage $V_T$ becomes ($Vcc - V_I$) due to the induced voltage $V_I$ generated by the rotation of the motor 2. At this time, the motor 2 is gradually slowly rotated because the MOSFET 3 is in an OFF state. Simultaneously, because the induced voltage $V_I$ is gradually reduced, the terminal voltage $V_T$ is gradually raised between the first and second reference voltages $V_R$ and $V_{R2}$, that is, $V_{R2} < V_T < V_{R1}$ and the comparators 8 and 41 provide "H" levels to the AND gate 42 which provides the "H" level to the D input of the latch 43. When the subsequent clock pulse P2 goes low level, the "H" level at the D input is passed to the Q output, and then to one input of the second AND gate 44. As this pulse P2 at "L" is also applied to the second input of the AND gate 44, the output Y of the second AND gate 44 turn off the MOSFET 3.

When the subsequent clock pulse P2 goes high level after ending the tL period, the Q output at "H" is latched and the output Y of the second AND gate 44 turn on the MOSFET 3. The MOSFET 3 in a turn on state makes the motor 2 faster than that at turn off.

If the motor 2 is stopped by the obstacle or under the torque over condition, that is, $V_{R1} < V_T (= Vcc - V_I)$ or if the motor 2 is rotated over the predetermined speed, that is, $V_T < V_{R2}$, then either output of the comparator 8 or 41 goes low to make the output of the AND gate 42 go low. Simultaneously, when the pulse P2 goes low and then high, the "L" level applied to the D input of the latch 43 from the AND gate 42, is transferred to the Q output thereof and then latched. The "L" level of the Q output is applied via the second AND gate 44 to the gate of the MOSFET 3 with a nano-second order delay to make the MOSFET 3 turn off and shut off the power supply to the motor 2. The DC motor 2 is prevented from burning the rotor or stator coils in case of trapping an obstacle within the power window. Alternatively, the rotation speed of the DC motor 2 is gradually slowed down in case of an over speed condition.

As described above, the voltages $V_{R1}$, $V_T$ and $V_{R2}$ are compared with each other when the respective pulse P2 goes low and then high. The MOSFET 3 repeats either "ON" or "OFF" state per the "tH" period depending upon relations between the $V_{R1}$ and $V_T$, and $V_T$ and $V_{R2}$. Finally, the rotation speed of the motor 2 converges on the predetermined value so that the terminal voltage $V_T$ closes $V_{R2}$. Therefore, the speed of the motor 2 is controlled to the predetermined speed by setting the $V_{R2}$ with second variable resistor 40.

In contrast, the torque of the motor 2 depends upon the minimum drive current $I_{min}$ as described as prior art, and then the torque against the stoppage or arrest of the motor 2 can be controlled by setting $V_{R1}$ with the first variable resistor 9. By using a battery as the power supply 1, frequently the motor drive current at the low voltage power supply is under the torque set by the variable resistor 9 and the motor 2 will not be stopped. In this invention, the power supply to the motor 2 is certainly shut off because no induced voltage occurs upon stoppage of the motor 2. Therefore, in the motor control circuit of the motor, its restraint torque by the variable resistor 9 and its rotation speed by the second variable resistor 40 can be controlled.

The second embodiment of the present invention also can control the additional speed of the DC motor by an "ON" or "OFF" control, or pulse width modulation of the drive transistor 3 as well as the restraint torque thereof by detecting indirectly its restraint torque and rotational speed from the induced voltage which depends upon the rotation of the motor 2.

Figure 7:
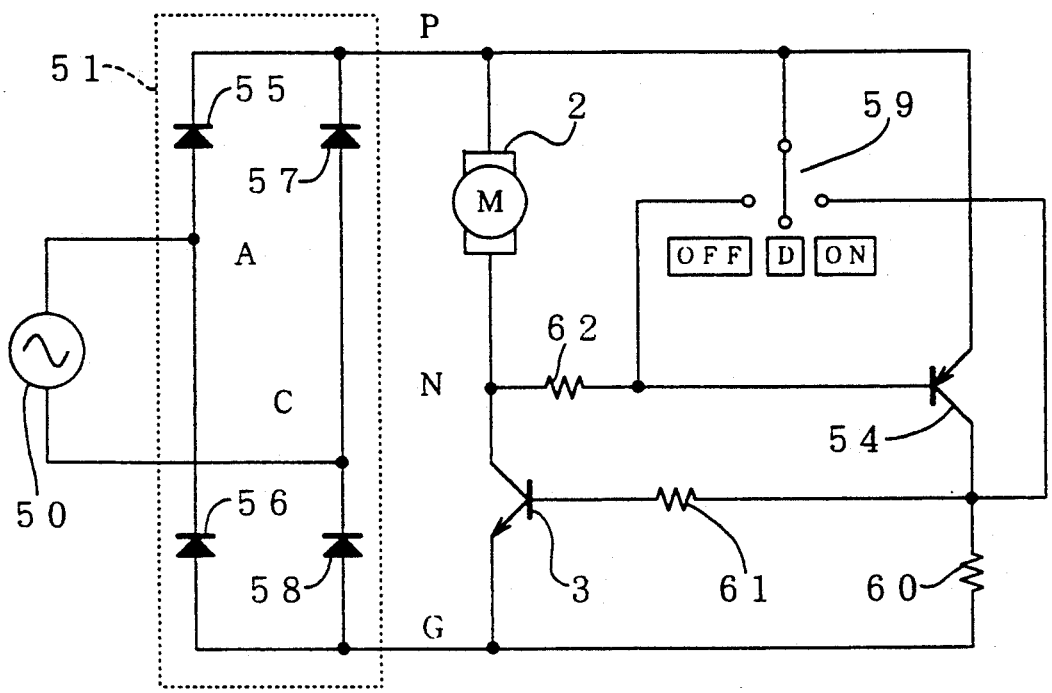
FIG. 7 is a schematic diagram of a circuit for controlling a DC motor showing a third embodiment of the invention.
Figure 8:
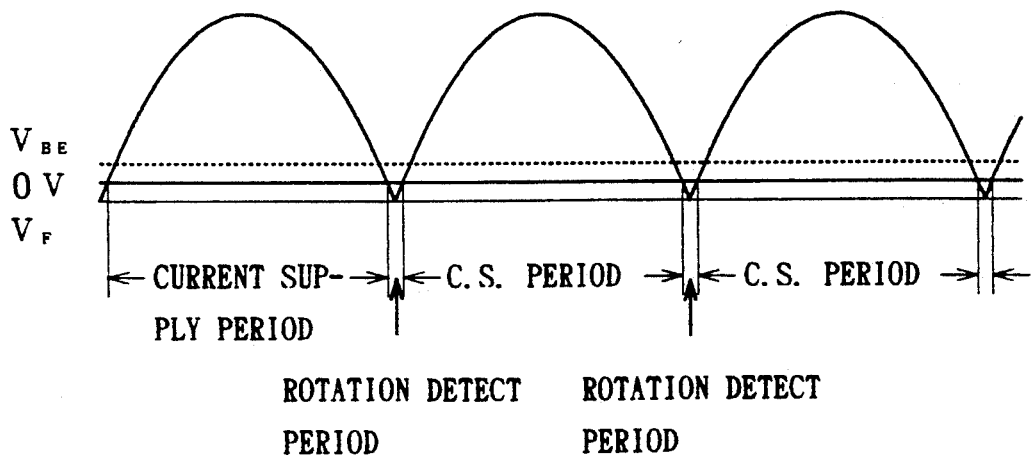
FIG. 8 is a timing chart of the control circuit of FIG. 7.

Referring now to FIG. 7, a third embodiment of the present invention or a circuit for controlling a DC motor is generally shown. The former two embodiments are proposed regarding a DC power supply whose voltage is substantially constant while the third embodiment is directed to use an AC power supply such as dynamo. A pulsating current as shown in FIG. 8 given by rectifying the AC power supply is supplied to a DC motor 2. A detecting period for periodically detecting a rotation speed or restraint torque of the DC motor is provided within a period in which the voltage, of the pulsating current approaches zero volts. This provides a simplified circuit which omits the conventional oscillator, comparator and AND gate.

In FIG. 7, the control circuit comprises an AC power supply 50, a rectifying circuit 51 connected to the AC power supply 50 to provide a pulsating current to the DC motor 2, a drive transistor 3 for driving the DC motor 2, and a detecting transistor 54 for detecting an induced voltage of the DC motor 2 for switching the drive transistor 3.

The AC power supply 50 is an AC generator such as a dynamo in case of the vehicle. Both lines of the AC supply 50 are connected to inputs A and C of the whole wave rectifying circuit 51 with four rectifiers. The rectifying circuit 51 has a pulsating output P connected to a common cathode of power diodes 55 and 57, and a pulsating output G connected to a common anode of power diodes 56 and 58. An anode of the diode 55 and a cathode of the diode 56 are connected together to provide the input A while an anode of the diode 57 and a cathode of the diode 58 are connected together to provide the input C. Alternatively one power diode may be used as the rectifying circuit 51 based on the cost thereof.

The positive pulsating output P is connected to one end of the DC motor 2, an emitter of detecting PNP transistor 54 and a movable contact of switch 59 while the negative pulsating output G is connected to an emitter of driving NPN power transistor 54 and a resistor 60. A resistor 61 is connected between a base of the transistor 3 and a collector of the transistor 54. A resistor 62 is connected between a base of the transistor 54 and a collector of the transistor 3. The collector of power transistor 3 is also connected to other end of the DC motor 2.

The switch 59 has three fixed contacts an "ON" position connected to the collector of the transistor 54 for triggering, a "D" position for an ordinal operation with no connection, an "OFF" position connected to the base of the transistor 54 for terminating.

In the preferred embodiment, the end of the DC motor 2 is connected to pulsating output P and though the drive transistor 3 uses an NPN power transistor, an N-channel power MOSFET having a low gate voltage under the ON state, for example, 1 volt may be used therewith. In the case of using the N-channel MOSFET, its drain is connected to the other end of the DC motor 2, its gate is connected to the resistor 62 and its source connected to ground.

In the alternative embodiment having the end of the DC motor 2 connected to negative pulsating output G, a PNP power transistor or J-channel power MOSFET may be used with an NPN or N-channel detecting transistor.

An operation of the third embodiment is described as follows.

The DC motor 2 under static conditions does not generate the induced voltage $V_I$ or $V_I=0$ volts. The detecting transistor 54 maintains an OFF state because the base to emitter voltage $V_{BE}$ thereof is lower than the $V_I$ and the transistor 54 becomes goes to an ON state when, for example, $V_{BE}>0.65$ volts, and then the drive transistor 3 maintains an OFF state.

When the DC motor 2 is rotated by outer means such as the switch 59 at the "ON" position, the induced voltage $V_I$ is generated with the potential of the end P being lower than that of the point N. If $V_T$ is higher than $V_p$ or $V_I>V_{BE}$ at a predetermined speed of the DC motor 2, the detecting transistor 54 goes to an ON state, and then the drive transistor 3 goes to an ON state to maintain the rotation of the DC motor 2 because of supplying drive current thereto. As the power supply voltage between the points P and G is periodically zero potential shown in FIG. 8, the drive transistor 3 is periodically and momentary turned off per a rotation checking period within which the P and G voltage is, for example, between 0 to 0.65 volts.

The DC motor 2 under no power supply condition can be supplied with the pulsating current when $V_I$ is higher than $V_{BE}$ by rotating the DC motor to cause transistors 54 and 3 to be turned on at subsequent current supplying periods. However, when the DC motor 2 is under a restraint condition in which the window glass meets with an obstacle against a frame of the door, or $V_I$ is on or lower than $V_{BE}$, there is insufficient current between the base to emitter of the detecting transistor 54 turn on the drive transistor 3. Therefore, the pulsating current is not supplied to the DC motor 2, and unnatural load is not applied to both the DC motor 2 the obstacle between the frame and the window glass driven by the DC motor 2.

The control circuit for the DC motor is triggered when the switch 59 is set to the ON position, and shut off when the switch is at the OFF position. When the switch 59 is at the "D" position, the control circuit is shut off leaving the DC motor 2 with the restraint condition.

Though the collector and base currents of the transistors 3 and 54 are also changed according to the potential of the point P, the "ON" states of the transistors 3 and 54 are not changed unless the potential of P is higher than 0.65 volts. For example, the base current and then the collector currents of the drive transistor is increased when the potential of the P is raised, or vice versa. Therefore, a flywheel may be mounted to a shaft of the DC motor 2 to reduce wow flutter of the rotation thereof.

The control circuit of the third embodiment is distinguished from the former two preferred embodiments in that the pulsating current power supply is provided from the AC power supply. In this embodiment, the pulse oscillator, the comparator, the AND gate and the smoothing means for the pulsating power supply are not necessary. Therefore, there are many advantages in which the control circuit thereto is simplified with higher reliability and lower cost than the former as well as the elimination of a series resistor passing a supply current to a DC motor.

The foregoing disclosure and description of the invention are illustrative and explanatory thereof, and various changes in the size, shape, materials, components, circuit elements, wiring connections and contacts, as well as in the details of the illustrated circuitry and construction may be made without departing form the spirit of the invention.

We claim:

1. A circuit for controlling a motor comprising: a DC power supply having a hot line connected to said motor and a cold line;
   a drive transistor connected between said motor, via a relay terminal, and said cold line to drive said motor;
   trigger means for supplying a trigger pulse to said drive transistor to provide an ON state for said drive transistor;
   comparing means for comparing a terminal voltage on said relay terminal with a reference voltage and providing an output to said drive transistor;
   means for periodically turning off said drive transistor to detect said terminal voltage depending upon the rotational speed of said motor;
   means coupled to receive a DC power supply voltage for regulating said reference voltage,
   means coupled to said DC power supply for detecting a low voltage of said DC power supply; and
   an AND gate connected to said comparing means and said low voltage detecting means to provide an output to said drive transistor to turn off said drive transistor when said power supply voltage is lower than a predetermined voltage.

2. A circuit for controlling a motor comprising:
   a DC power supply having a hot line connected to said motor and a cold line;
   a drive transistor connected between said motor, via a relay terminal, and said cold line to drive said motor;
   trigger means for supplying a trigger pulse to said drive transistor to provide an ON state for said drive transistor;
   comparing means for comparing a terminal voltage on said relay terminal with a reference voltage and providing an output to said drive transistor;
   means for periodically turning off said drive transistor to detect said terminal voltage depending upon the rotational speed of said motor;
   means coupled to receive a power supply voltage for regulating said reference voltage;
   low voltage detecting means coupled to said DC power supply for detecting a low voltage of said DC power supply; and
   wherein said drive transistor is turned off by said low voltage detecting means when an input voltage of said comparing means is higher than a predetermined value of said terminal voltage.

3. A circuit according to claim 2, wherein said terminal voltage is applied to said comparing means via dividing means.

4. A circuit for controlling a DC motor comprises:

a first comparator for comparing a terminal voltage of said DC motor with a first reference voltage;

a second comparator for comparing said terminal voltage of said DC motor with a second reference voltage;

an AND gate for receiving outputs of said first and second comparators;

a drive transistor for supplying power to said DC motor;

said drive translator having ON and OFF conditions controlled by the output of said AND gate and a periodical clock pulse; and a restraint torque control for providing said first reference voltage having a predetermined value and a rotational speed control for providing said second reference voltage having a predetermined value.

5. A circuit for controlling a DC motor comprises:

a first comparator for comparing a terminal voltage of said DC motor with a first reference voltage;

a second comparator for comparing said terminal voltage of said DC motor with a second reference voltage;

a first AND gate for receiving outputs of said first and second comparators;

a latch circuit for latching the output of said first AND gate by a periodical clock pulse;

a second AND gate for receiving the output of said latch circuit and said clock pulse;

a drive transistor receiving the output of said second AND gate for supplying power to said DC motor; and a restraint torque control for providing said first reference voltage having a predetermined value and a rotational speed control for providing said second reference voltage having a predetermined value.

6. A circuit for controlling a DC motor comprises:

an AC power supply;

a rectifying means for rectifying the voltage of said AC power supply to provide a pulsating DC source having a hot line connected to said motor and a cold line;

a drive transistor connected between said motor, via a relay terminal, and said cold line to drive said motor;

a trigger means for supplying a trigger pulse to said drive transistor to provide an ON state for said drive transistor; and a detecting transistor for comparing a voltage on said relay terminal with an internal voltage of said detecting transistor and providing an output to said drive transistor.

7. A circuit according to claim 6, wherein said DC motor has one end connected to said hot line;

said drive transistor comprises an NPN transistor having its emitter connected to said cold line, and its collector connected to the other end of said DC motor;

said detecting transistor comprises a PNP transistor having its emitter connected to said hot line, its base connected to said other end of said DC motor via a resistor, and its collector connected to said cold line via a second resistor and to the base of said NPN drive transistor via a third resistor.

* * * * *